April 8, 1941.  B. D. McINTYRE  2,237,743

VISCOSIMETER

Filed May 23, 1938

INVENTOR.
BROUWER D. MCINTYRE
BY
ATTORNEYS

Patented Apr. 8, 1941

2,237,743

UNITED STATES PATENT OFFICE 2,237,743

VISCOSIMETER

Brouwer D. McIntyre, Monroe, Mich., assignor to Insulation Development Corporation, Monroe, Mich., a corporation of Michigan Application May 23, 1938, Serial No. 209,575

3 Claims. (Cl. 265—11)

This invention relates generally to apparatus for measuring the viscosity and consistency of fluids.

One of the principal objects of this invention consists in the provision of a relatively simple viscosimeter which is dependable in operation and which is capable of accurately measuring the viscosity of a liquid in accepted viscosity units.

Another advantageous feature of this invention resides in the provision of a portable viscosimeter capable of being used for testing oils or other liquids during either the mixture or preparation thereof, and also rendering it possible to rapidly inspect large volumes of fluids which, for one reason or another, cannot be conveniently sampled for laboratory testing.

Still another object of the present invention consists in the provision of an electric viscosimeter embodying a member rotatable in the liquid to be tested at a constant speed by an electric motor arranged in an electric circuit embodying means for indicating the torque required to rotate the member in the liquid in terms of the power input to the motor. Inasmuch as the torque required to revolve a member at a constant speed through the liquid varies in direct proportion to the coefficient of viscosity of the liquid, it follows that the selected units of measurements of the torque will also suffice to indicate the consistency or viscosity of the fluid.

A further advantageous feature of this invention which contributes to obtaining a high degree of accuracy, especially in cases where it is desirable to test the viscosity of fluid in large tanks or vats, resides in the provision of means for establishing the film thickness or weight of fluid on the revoluble member, irrespective of the size of the container or vat.

The foregoing, as well as other objects, will be made more apparent as this description proceeds, especially when considered in connection with the accompanying drawing, wherein.

In general, each of the various different modifications of the present invention, selected herein for the purpose of illustration, provides for measuring the viscosity of liquids in terms of the torque required to turn a disc or paddle through the liquid at a constant speed. The principle of the invention may be briefly stated as based on the existence of constant relation of the shearing force on the revoluble member in the liquid to the viscosity of the liquid when the velocity and area of the member remain constant. The above may be expressed mathematically by the following equation:

$$F = u \times \frac{V}{t}$$

where $F$ represents the shearing force in dynes; $u$, coefficient of viscosity; $V$, velocity in centimeters per second; and $t$, the film thickness in centimeters.

Figure 1:
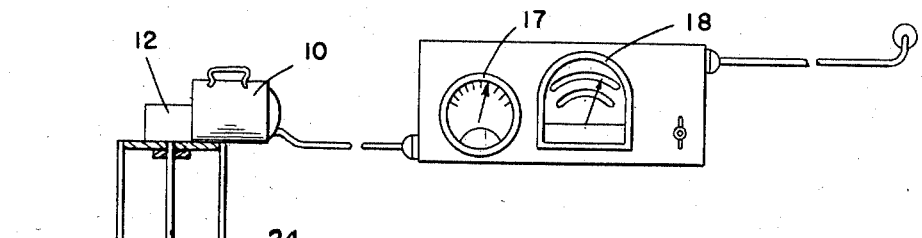
Figure 1 is a semi-diagrammatic view of an electric viscosimeter constructed in accordance with this invention.
Figure 2:
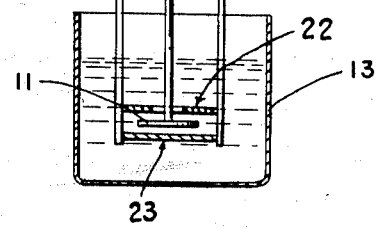
Figure 2 is a diagram of the circuit of the viscosimeter shown in Figure 1.
Figure 2:
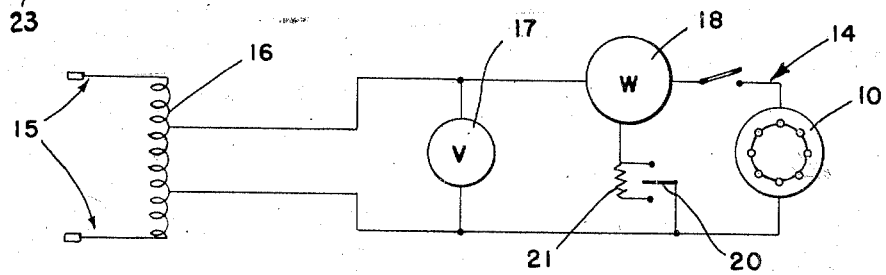

It follows from the above that the torque required to revolve the member at a constant speed through the liquid depends upon and varies in direct proportion to the coefficient of viscosity of the liquid. Inasmuch as the torque is directly proportional to the power consumed by the electric motor for revolving the member, it follows that the reading on the ammeter or wattmeter scale gives the viscosity in terms of units in which the scale is calibrated. With this in mind, reference will now be made to the embodiment of the invention illustrated in Figures 1 and 2. In the above figures, the reference character 10 indicates an electric motor of the single phase squirrel-cage type embodying a condenser and capable of producing a straight-line power torque curve up to and beyond the maximum torque to be measured. The motor 10 is shown in Figure 1 as operatively connected to a paddle or disc 11 through the medium of a speed reducer 12, and the paddle is illustrated as positioned in a tank 13 below the level of the liquid having a viscosity it is desired to measure. The motor 10 is shown in Figure 2 as connected in an electric circuit 14 and the latter is shown as connected to the power line 15 through the medium of an auto-transformer 16. The auto-transformer 16 renders it possible to maintain the line voltage supplied to the circuit 14 to a given value and this voltage is measured by a voltmeter 17 connected across the circuit 14. In this embodiment of the invention, a wattmeter 18 is also arranged in the circuit to measure the power consumed by the motor 10 in revolving the disc 11 in the liquid contained in the tank 13.

The auto-transformer 16 is adjusted to provide a motor speed sufficiently high that the shearing force or torque on the disc 11 is kept within the torque range of the motor for the particular liquid to be measured, but care is taken to maintain the speed of the motor low enough that the disc 11 will not "churn" in the liquid, since this would cause a decided error in the viscosity reading. The particular voltage selected is indicated by the voltmeter 17 and is maintained substantially constant by regulating the auto-transformer 16. The power consumed by the electric motor 10 in revolving the disc 11 in the liquid, of course, varies in direct proportion to the torque required for rotating the disc, and this power is indicated by the wattmeter 18. As stated above, the torque required to turn the disc 11 in the liquid at the constant speed of the motor depends upon and varies in direct proportion to the coefficient of viscosity of the liquid being measured. It follows, therefore, that the measurement indicated by the wattmeter will serve to accurately designate the consistency and viscosity of the liquid. If desired, the wattmeter 18 may be provided with two scales, one indicating the power input to the motor in terms of watts and the other indicating the viscosity of the liquid in terms of accepted units of measurement.

In testing the viscosity or consistency of relatively light liquids, it may be advantageous to increase the sensitivity of the scale reading on the watt-meter. This is accomplished, in the present instance, by providing a switch 20 in the circuit 14 which will selectively introduce all or part of the wattmeter resistance 21 in the circuit.

In the above quotation of the equation, it will be noted that a value (t) is referred to as representing the film thickness of the liquid in centimeters and this film thickness is important in cases where extreme accuracy is desired. In Figure 1 of the drawing, I have illustrated an arrangement whereby the film thickness (t) is substantially constant regardless of the size of the vessel containing the fluid to be tested. As shown in Figure 1, the foregoing is accomplished by providing a pair of stationary discs 22 and 23 suspended in the liquid by supports 24 in a manner to assume positions immediately adjacent opposite sides of the rotatable disc 11. The discs are shown as disposed in planes parallel to the plane of the disc 11 and the spacing between the discs 22 and 23 controls the film thickness or, in other words, determines the resistance offered by the fluid to rotation of the member. With the above construction, the torque or power input to the motor is proportional to the absolute viscosity of the fluids tested and is, therefore, important in obtaining accurate results.

Figure 3:
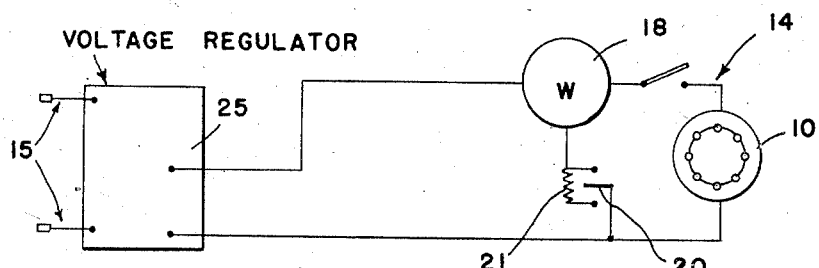
Figure 3 is a diagram of a circuit for a slightly modified form of viscosimeter.

In the embodiment of the invention illustrated in Figure 3, I have substituted an automatic voltage regulator 25 for the auto-transformer 16 and voltmeter 17 shown in Figures 1 and 2. The automatic voltage regulator 25 is of standard accepted design and is for the purpose of maintaining the desired voltage without attention on the part of the operator. With the above exception, the embodiment shown in Figure 3 operates in the same manner as the one previously described in connection with Figures 1 and 2.

Figure 4:
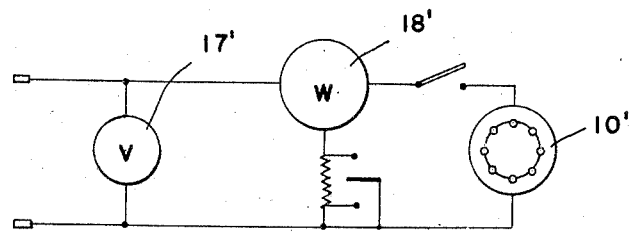
Figure 4 is a diagram of a circuit for still another type of viscosimeter.

In the embodiment of the invention illustrated in Figure 4, I have shown a relatively simple circuit that may be employed for measuring the consistency and viscosity of liquids. The principle of operation of this embodiment, however, is the same as stated above in that the viscosity of the liquid is measured in terms of the power input to the electric motor 10' by means of a wattmeter 18'. As in the first described form of the invention, the voltage is measured by a voltmeter 17' which is connected across the circuit. In the construction shown in Figure 4, however, no provision is made for varying the line voltage and, in this way, the device is simpler than either of the foregoing arrangements.

It will be noted from the above that in each of the selected embodiments of the invention, the coefficient of viscosity and consistency of liquids are measured in terms of the power input to the motor for driving the revoluble member in the liquid. It will also be noted that each of the various embodiments of the invention is relatively simple and may be arranged in a compact unit capable of being readily transported from one point to another. It should further be understood that no effort has been made to show all of the various circuits that may be employed to measure the viscosity of the liquid in terms of the power input to the driving means and, therefore, reservation is made to make such changes in the several constructions as may come within the purview of the accompanying claims.

What I claim as my invention is:

1. In apparatus for measuring the viscosity of a fluid, a revoluble member adapted to be inserted in the fluid and having substantially smooth uninterrupted opposite side surfaces, an electric motor for rotating the revoluble member and connected in an electric circuit, a meter also in the circuit responsive to variations in the power input to the motor for indicating the viscosity of the fluid, and a pair of substantially flat plates positioned on opposite sides of the revoluble member in planes extending substantially parallel to the surface of revolution of said member, said plates having substantially smooth uninterrupted surfaces adjacent the uninterrupted side surfaces aforesaid of the member and being spaced a predetermined distance from opposite sides of the member to establish a definite film thickness factor.

2. In apparatus for measuring the viscosity of a fluid, a revoluble member adapted to be inserted in the fluid to be tested and having substantially smooth uninterrupted opposite side surfaces, means for rotating the member at a substantially constant speed predetermined to prevent churning of the fluid by the member, means responsive to the power required to rotate the member in the fluid at substantially the constant speed to determine the coefficient of viscosity of the fluid, and plates positioned on opposite sides of the revoluble member in planes extending substantially parallel to the surface of revolution of said member, said plates having substantially smooth uninterrupted surfaces adjacent the opposite side surfaces of the member and cooperating with each other to provide a substantially uniform film thickness of the fluid on opposite sides of said member.

3. In apparatus for measuring the viscosity of a fluid, a revoluble disc adapted to be immersed in the fluid to be tested and having substantially smooth uninterrupted opposite side surfaces, means for driving the disc at a substantially constant speed, means responsive to the torque required to rotate the disc in the fluid at the constant speed aforesaid to indicate the viscosity of the fluid, means for maintaining a predetermined film thickness of fluid on opposite sides of the disc including a pair of plates spaced from opposite sides of the disc and having substantially smooth uninterrupted surfaces adjacent the opposite side surfaces aforesaid of the disc, and means carried by said driving means for supporting the plates in proper relationship to the revoluble disc and thereby provide a unitary assembly capable of being readily transported.

BROUWER D. McINTYRE.